UNITED STATES PATENT OFFICE.

FREDERICK J. MAYWALD, OF NEW YORK, N. Y.

COLORING MATERIAL AND PROCESS OF MAKING SAME.

No. 893,636.  Specification of Letters Patent.  Patented July 21, 1908.

Application filed June 14, 1904. Serial No. 212,500.

*To all whom it may concern:*

Be it known that I, FREDERICK J. MAYWALD, a citizen of the United States, residing in the borough of Brooklyn, city of New York, county of Kings, and State of New York, have invented certain new and useful Improvements in Coloring Materials and Methods of Preparing the Same; and I do hereby declare the following to be a full, clear, and exact description of the same, such as will enable others skilled in the art to which it appertains to make and use the same.

My invention relates generally to coloring materials derived from what may be termed generically dyewoods, and to methods of preparing same; and more specifically, my invention relates to coloring materials obtained from vegetable materials, such as fustic, and Persian berry, the coloring matters of which are not oxidized, as are the coloring matters of logwood and Brazil wood, for example.

My invention consists in a method of producing, from dyewood extracts containing such unoxidized coloring matter, a dry, friable and substantially non-hygroscopic but water-soluble coloring material, which will not run together with exposure to heat; and my invention consists further in the coloring material so produced.

Extracts of dyewoods, as, for example, fustic, as commonly made and used in the arts, are in the form either of a liquid, a paste, or a mass having the consistency of thick pitch. There are several objections to the extracts in these forms, as is well known to those skilled in the art; such as, for example, liability to injury through freezing, liability to leakage, trouble and waste in handling, liability to variation in tinctorial power due to evaporation or other cause, and difficulty of dissolving in cold water. And if the dyewood extract be evaporated to dryness, it will melt or run together.

One object of my invention is to produce from dyewoods containing unoxidized coloring matter, and particularly from fustic, a dry material, which, while having high tinctorial power, is non-hygroscopic, is not affected injuriously by moisture of the air, nor by heat, is friable, permanent, and is readily and completely soluble in cold water.

Another object is to render the process of preparing the coloring material simple, easy to carry out, and relatively inexpensive.

A further object is to avoid the production of corrosive gases, or noxious or dangerous fumes or odors, such as are given off during the manufacture of fustic powders by certain chemical methods.

In carrying out my process, I add to the dyewood extract to be solidified one of the colloidal carbohydrate bodies hereafter mentioned, and then evaporate the mixture to dryness. The substance which I prefer to use is dextrin, and it is preferably used in solution, as by so doing more uniform results may be obtained. But instead of using dextrin, I may use other similar bodies, as, for example, gum arabic, tragacanth, or other gum of similar type. The compounds resulting from the mixture of the substances named with dyewood extracts, and from the evaporation of the mixtures, dry rapidly and easily to a powder which is permanent, dry, substantially non-hygroscopic, and will not run together when exposed to heat or when exposed for a considerable time to moist air such as may exist within a bell jar when there is a dish of water therein. If, after long-continued exposure to wet air, the powder has slightly agglutinated, it will readily fall to a powder again, or can be broken up easily after a short exposure to dry air. This powder is readily and completely soluble in cold water and easily and rapidly soluble in hot water. During its preparation and manufacture no noxious or dangerous fumes or odors, or corrosive gases, are given off; no complicated apparatus is required, and the temperature to which the material is exposed during drying need not be watched closely. Any temperature may be used, so long as it is below the temperature of destruction of the organic matter. Drying may take place with equal facility in open pans or in a vacuum chamber. The resulting compounds, when in solution, dye wool which has been mordanted in the usual way with bichromate and tartaric acid, readily and easily, and with full shade, the same as if ordinary fustic extract had been used, but with purer tone and with more uniform results.

The following will serve as an example of a method of producing, according to my process, a dry compound from fustic extract by the use of dextrin: To 100 lbs. of fustic extract of 51 degrees Twaddell is added 10 lbs. of dextrin which has been dissolved in a small quantity of water. The mixture is stirred well, and then evaporated to dryness.

The resulting mass falls readily to powder, mere rubbing being sufficient to reduce it to a fine powder. It will be apparent to those skilled in the art, from the above description, how similar dry compounds may be obtained from other dyewood extracts containing unoxidized coloring matter, and from fustic or other extracts by the use of any of the substances mentioned above as equivalents of dextrin.

While fustic and similar coloring materials of the non-oxidized class are customarily derived from vegetable sources, I do not mean to exclude application of my invention to the same or similar coloring materials, if produced synthetically.

I do not limit myself to the use of a 51 degree Twaddell solution, but may use solutions of different strength. The particular solution mentioned, however, is the one most used commercially. I do not limit myself to the use of any particular proportion of the dextrin or other solidifying agent, as the proportion of such material used may vary somewhat, according to the result desired to be obtained.

I do not limit myself to the use of any particular mordant in connection with the coloring or dyeing material produced by my process. The same mordants may be used which are used in connection with ordinary dyewood extracts of similar nature.

It will be understood that the process above described is only one way of carrying out my invention, and that the process may be varied greatly without departing from my invention.

If desired, the dextrin or other solidifying agent may be added to the dyewood extract during the operation of extracting the coloring material from its vegetable source, my process being combined with that of producing the extract. And if desired, instead of adding the solidifying material to a liquid solution, it may be added to the pasty, pitchlike, or even to the solid forms of the dyewood extract, and I do not intend by the term "extract" as herein used, to denote only a liquid substance, but intend also to include the pasty, pitch-like, or even dry form of the dyewood coloring material.

I have used the term "dyewood" herein in a generic sense to distinguish coloring materials which may be obtained from vegetable matter, from dyeing materials of an inorganic or chemical nature, and from anilin dyes; but I do not intend thereby to exclude the application of my process to the same or similar coloring matters produced synthetically, instead of from vegetable sources, but to the contrary, regard the application of my process to such synthetically prepared coloring materials as falling within my invention and within the following claims.

Fustic and other dyewood extracts containing coloring material of the non-oxidized class, of 51 degrees Twaddell strength, usually contain from 60 to 70 per cent. of dyewood extractive matter; from which it follows that in the dry compound formed from such an extract to which 10 per cent. of dextrin has been added, there will be from 12 to 14 per cent. of dextrin, approximately.

In another application for Letters Patent, filed June 14, 1904, Sr. No. 212,499, I have claimed my said invention as applied to dyewood extracts broadly, and have also claimed the same process as applied to the production of a dry compound from dyewood extracts containing coloring matter of the oxidized class. Therefore, such inventions are not claimed herein.

What I claim is:—

1. The process of preparing a dry friable dyestuff from viscous fustic extracts which consists in adding a colloidal carbohydrate to such fustic extracts and evaporating the mixture to a dry friable condition.

2. The process of preparing a dry friable dyestuff from viscous fustic extracts which consists in adding dextrin to such extracts and evaporating the mixture to a dry friable condition.

3. As a new article of manufacture, the herein described dry friable mixture of fustic extract with a colloidal carbohydrate.

4. As a new article of manufacture, the herein described dry friable mixture of fustic extract and dextrin.

In testimony whereof I affix my signature, in the presence of two witnesses.

FREDERICK J. MAYWALD.

Witnesses:
D. HOWARD HAYWOOD,
H. M. MARBLE.